(12) United States Patent
Silver et al.

(10) Patent No.: US 8,825,260 B1
(45) Date of Patent: Sep. 2, 2014

(54) OBJECT AND GROUND SEGMENTATION FROM A SPARSE ONE-DIMENSIONAL RANGE DATA

(71) Applicant: Google Inc., Mountain View, CA (US)

(72) Inventors: David Harrison Silver, Santa Clara, CA (US); David Ian Franklin Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/948,207

(22) Filed: Jul. 23, 2013

(51) Int. Cl.
  *G01S 17/93* (2006.01)
(52) U.S. Cl.
  USPC ............. 701/23; 701/300; 701/301; 701/302; 342/29; 342/54; 342/70; 342/118; 342/159
(58) Field of Classification Search
  None
  See application file for complete search history.

(56) References Cited

U.S. PATENT DOCUMENTS

| | | | |
|---|---|---|---|
| 6,018,308 A * | 1/2000 | Shirai | 342/70 |
| 6,670,912 B2 * | 12/2003 | Honda | 342/70 |
| 6,832,156 B2 * | 12/2004 | Farmer | 701/301 |
| 7,583,817 B2 * | 9/2009 | Kimura et al. | 382/104 |
| 7,592,945 B2 * | 9/2009 | Colburn et al. | 342/70 |
| 7,742,841 B2 * | 6/2010 | Sakai et al. | 700/255 |
| 7,777,618 B2 * | 8/2010 | Schiffmann et al. | 340/436 |
| 8,199,977 B2 | 6/2012 | Krishnaswamy et al. | |
| 8,260,539 B2 | 9/2012 | Zeng | |
| 8,334,802 B2 * | 12/2012 | Ogawa | 342/129 |
| 2003/0001771 A1 * | 1/2003 | Ono | 342/70 |
| 2003/0004644 A1 * | 1/2003 | Farmer | 701/301 |
| 2003/0011509 A1 * | 1/2003 | Honda | 342/70 |
| 2005/0225439 A1 * | 10/2005 | Watanabe et al. | 340/435 |
| 2006/0115113 A1 * | 6/2006 | Lages et al. | 382/103 |
| 2008/0077327 A1 * | 3/2008 | Harris et al. | 701/301 |
| 2008/0111733 A1 * | 5/2008 | Spyropulos et al. | 342/189 |
| 2009/0002222 A1 * | 1/2009 | Colburn et al. | 342/145 |
| 2009/0228204 A1 * | 9/2009 | Zavoli et al. | 701/208 |
| 2009/0240432 A1 * | 9/2009 | Osanai | 701/300 |
| 2010/0098297 A1 * | 4/2010 | Zhang | 382/104 |
| 2011/0221628 A1 * | 9/2011 | Kamo et al. | 342/70 |
| 2011/0248880 A1 * | 10/2011 | Miyahara et al. | 342/54 |
| 2011/0282581 A1 * | 11/2011 | Zeng | 701/301 |
| 2011/0309967 A1 * | 12/2011 | Choe et al. | 342/54 |
| 2012/0035797 A1 * | 2/2012 | Oobayashi et al. | 701/23 |
| 2012/0045119 A1 * | 2/2012 | Schamp | 382/157 |
| 2012/0281907 A1 * | 11/2012 | Samples et al. | 382/159 |
| 2013/0027511 A1 * | 1/2013 | Takemura et al. | 348/42 |
| 2013/0300897 A1 * | 11/2013 | KANAMOTO et al. | 348/231.99 |

* cited by examiner

*Primary Examiner* — Jonathan M Dager

(74) *Attorney, Agent, or Firm* — McDonnell Boehnen Hulbert and Berghoff

(57) ABSTRACT

Methods and systems for object and ground segmentation from a sparse one-dimensional range data are described. A computing device may be configured to receive scan data representing points in an environment of a vehicle. The computing device may be configured to determine if a test point in the scan data is likely to be an obstacle or ground by comparing the point to other points in the scan data to determine if specific constraints are violated. Points that do not pass these tests are likely to be above the ground, and therefore likely belong to obstacles.

20 Claims, 8 Drawing Sheets

COMPUTER PROGRAM PRODUCT 800

SIGNAL BEARING MEDIUM 801

PROGRAM INSTRUCTIONS 802

- RECEIVING, AT A COMPUTING DEVICE, SCAN DATA REPRESENTING A PLURALITY OF POINTS IN AN ENVIRONMENT ASSOCIATED WITH A GROUND AND ONE OR MORE OBJECTS ON OR PROXIMATE TO THE GROUND

- DETERMINING, USING THE SCAN DATA, A HORIZONTAL DISTANCE BETWEEN A FIRST POINT OF THE PLURALITY OF POINTS AND A SECOND POINT OF THE PLURALITY OF POINTS

- FOR THE HORIZONTAL DISTANCE BEING GREATER THAN A THRESHOLD HORIZONTAL DISTANCE, DETERMINING A SLOPE OF A LINE CONNECTING THE FIRST POINT AND THE SECOND POINT

- MAKING A COMPARISON BETWEEN THE SLOPE AND A PREDETERMINED SLOPE FOR THE GROUND

- BASED ON AN OUTPUT OF THE COMPARISON INDICATING THE SLOPE BEING WITHIN A THRESHOLD SLOPE VALUE TO THE PREDETERMINED SLOPE, DETERMINING THAT THE SECOND POINT IS A CANDIDATE GROUND POINT ASSOCIATED WITH THE GROUND AND UNASSOCIATED WITH THE ONE OR MORE OBJECTS

| COMPUTER READABLE MEDIUM 803 | COMPUTER RECORDABLE MEDIUM 804 | COMMUNICATIONS MEDIUM 805 |

FIGURE 8

OBJECT AND GROUND SEGMENTATION FROM A SPARSE ONE-DIMENSIONAL RANGE DATA

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure describes embodiments that relate to object and ground segmentation from a sparse one-dimensional range image. In one aspect, the present disclosure describes a method. The method comprises receiving, at a computing device, scan data representing a plurality of points in an environment associated with a ground and one or more objects on or proximate to the ground. The method also comprises determining, using the scan data, a horizontal distance between a first point of the plurality of points and a second point of the plurality of points. The method further comprises, for the horizontal distance being greater than a threshold horizontal distance, determining a slope of a line connecting the first point and the second point. The method also comprises making a comparison between the slope and a predetermined slope for the ground. The method further comprises, based on an output of the comparison indicating the slope being within a threshold slope value from the predetermined slope, determining that the second point is a candidate ground point associated with the ground and unassociated with the one or more objects.

In another aspect, the present disclosure describes a non-transitory computer readable medium having stored thereon instructions that, when executed by a computing device, cause the computing device to perform functions. The functions comprise receiving scan data representing a plurality of points in an environment associated with a ground and one or more objects on or proximate to the ground. The functions also comprise determining, using the scan data, a horizontal distance between a first point of the plurality of points and a second point of the plurality of points. The functions further comprise, for the horizontal distance being greater than a threshold horizontal distance, determining a metric indicative of a slope of a line connecting the first point and the second point. The functions also comprise making a comparison between the metric indicative of the slope of the line and a corresponding metric indicative of a predetermined slope for the ground. The functions further comprise, based on an output of the comparison indicating that the metric is within a threshold value from the corresponding metric, determining that the second point is a candidate ground point associated with the ground and unassociated with the one or more objects.

In still another aspect, the present disclosure describes a system. The system comprises at least one processor; and data storage comprising instructions that, when executed by the at least one processor, cause the system to perform functions. The functions comprise receiving scan data representing a plurality of points in an environment associated with a ground and one or more objects on or proximate to the ground. The functions also comprise determining, using the scan data, a horizontal distance between a first point of the plurality of points and a second point of the plurality of points. The functions further comprise, for the horizontal distance being greater than a threshold horizontal distance, determining a metric indicative of a slope of a line connecting the first point and the second point. The functions also comprise making a comparison between the metric indicative of the slope of the line and a corresponding metric indicative of a predetermined slope for the ground. The functions further comprise, based on an output of the comparison indicating that the metric is within a threshold value from the corresponding metric, determining that the second point is a candidate ground point associated with the ground and unassociated with the one or more objects.

In still another aspect, the present disclosure describes a device. The device comprises a means for receiving scan data representing a plurality of points in an environment associated with a ground and one or more objects on or proximate to the ground. The device also comprises a means for determining, using the scan data, a horizontal distance between a first point of the plurality of points and a second point of the plurality of points. The device further comprises a means for determining a slope of a line connecting the first point and the second point. The device also comprises a means for making a comparison between the slope and a predetermined slope for the ground. The device further comprises a means for determining, based on an output of the comparison indicating the slope being within a threshold slope value to the predetermined slope, that the second point is a candidate ground point associated with the ground and unassociated with the one or more objects.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a schematic illustrating a conceptual partial view of a computer program, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road relies on detecting a road surface and obstacles on or proximate to the road surface for navigation. In one example, the vehicle may be configured to collect dense three-dimensional (3D) point cloud, and segment the point cloud into obstacles and ground. However, this approach may involve use of high resolution point clouds and may thus be computationally inefficient. When traveling at high speeds, and/or operating with low resolution or low update rate sensors, reducing data acquisition time and processing time may improve vehicle performance.

In one example, the vehicle may be configured to separate obstacles from a road surface using a sparse, single dimensional range scan/line scan data. The vehicle may, for instance, be configured to determine if a test point in the scan data is likely to be an obstacle or flat ground by comparing the point to other points in the scan data to determine if specific constraints are violated. Points that do not pass these tests are likely to be above the ground, and therefore likely belong to obstacles.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
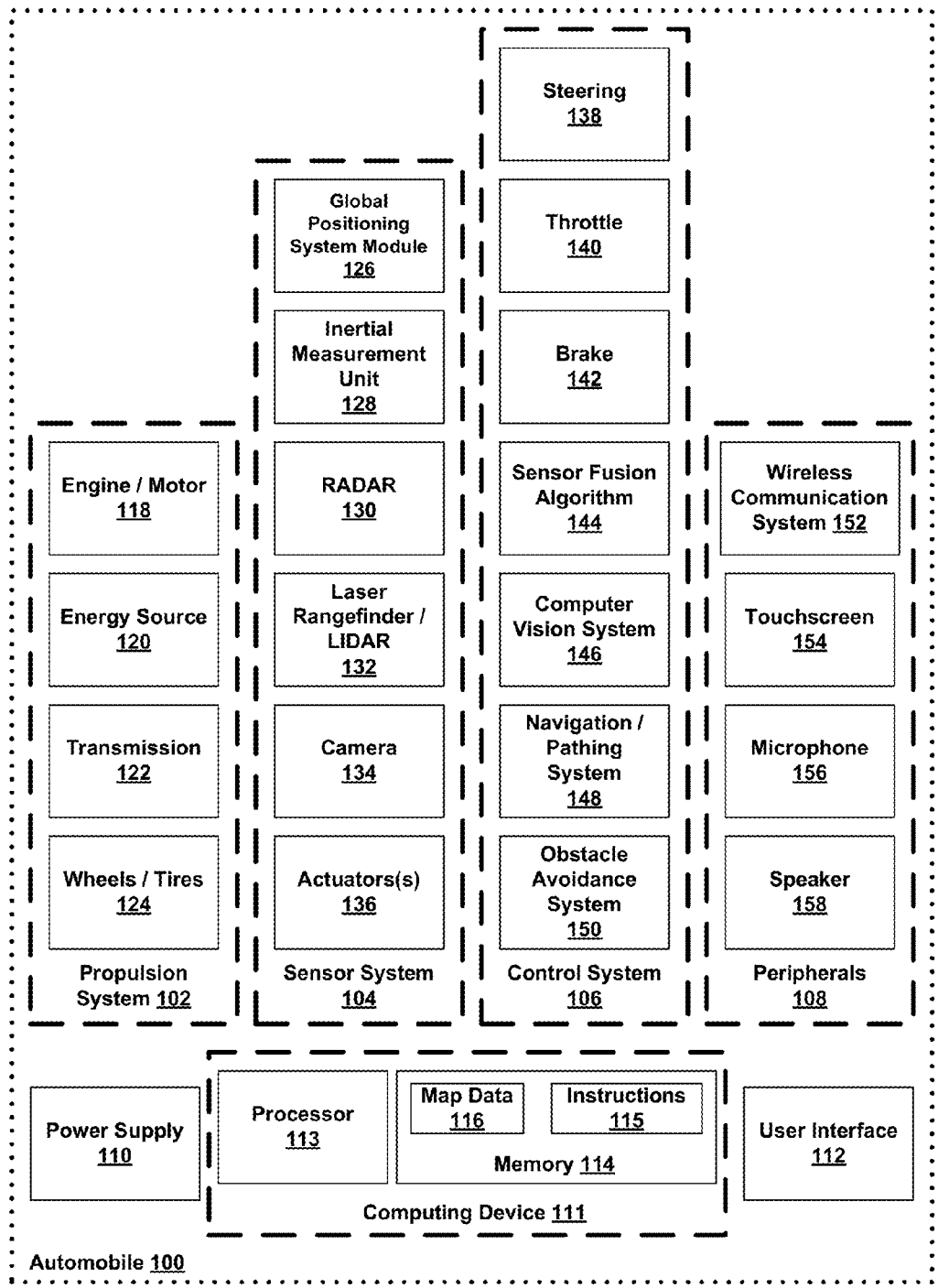
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an O2 monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
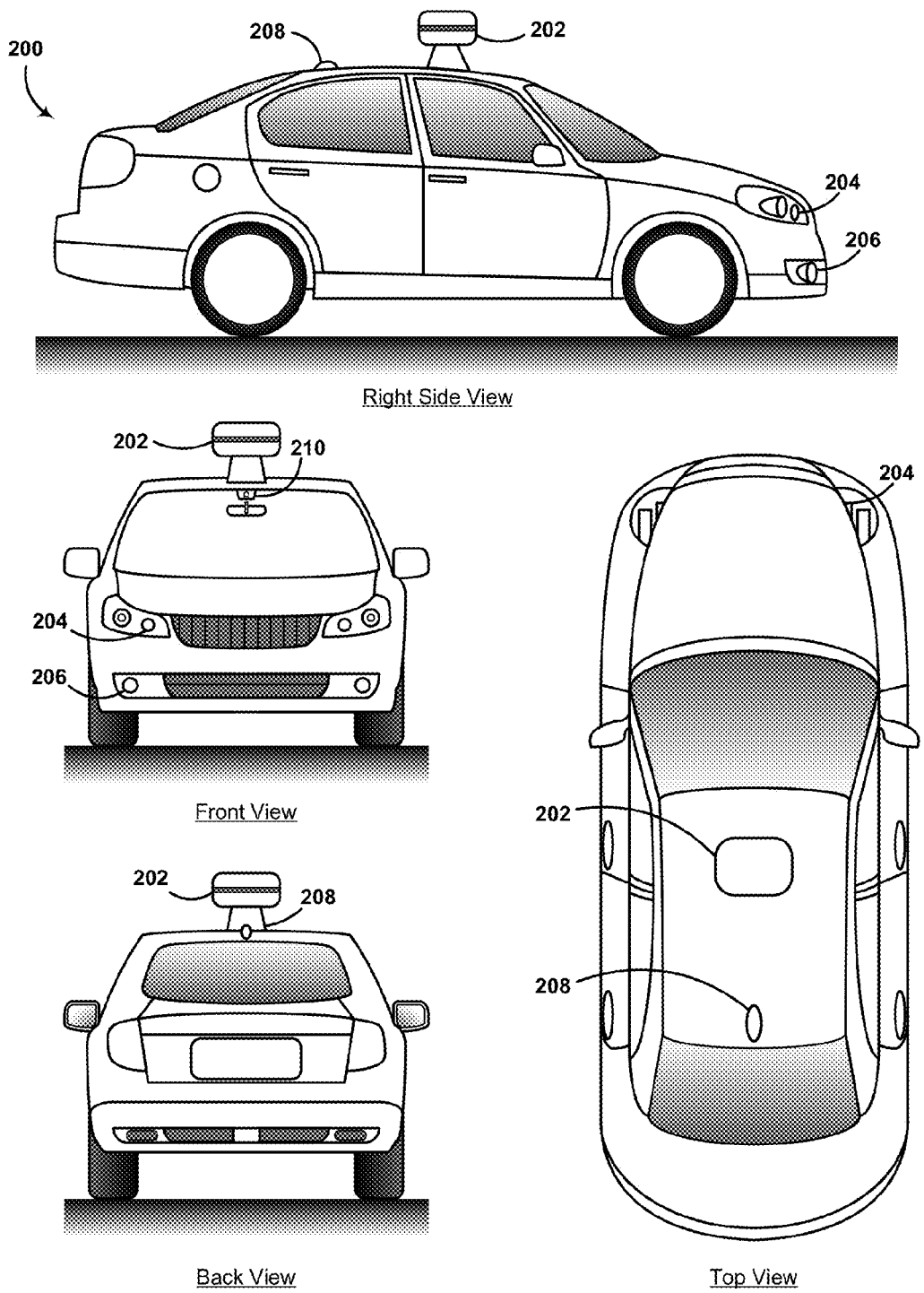
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to perceive an environment of the vehicle and detect obstacles, ground, and free space and control the automobile 200 in accordance with a control strategy from among multiple possible control strategies.

Figure 3:
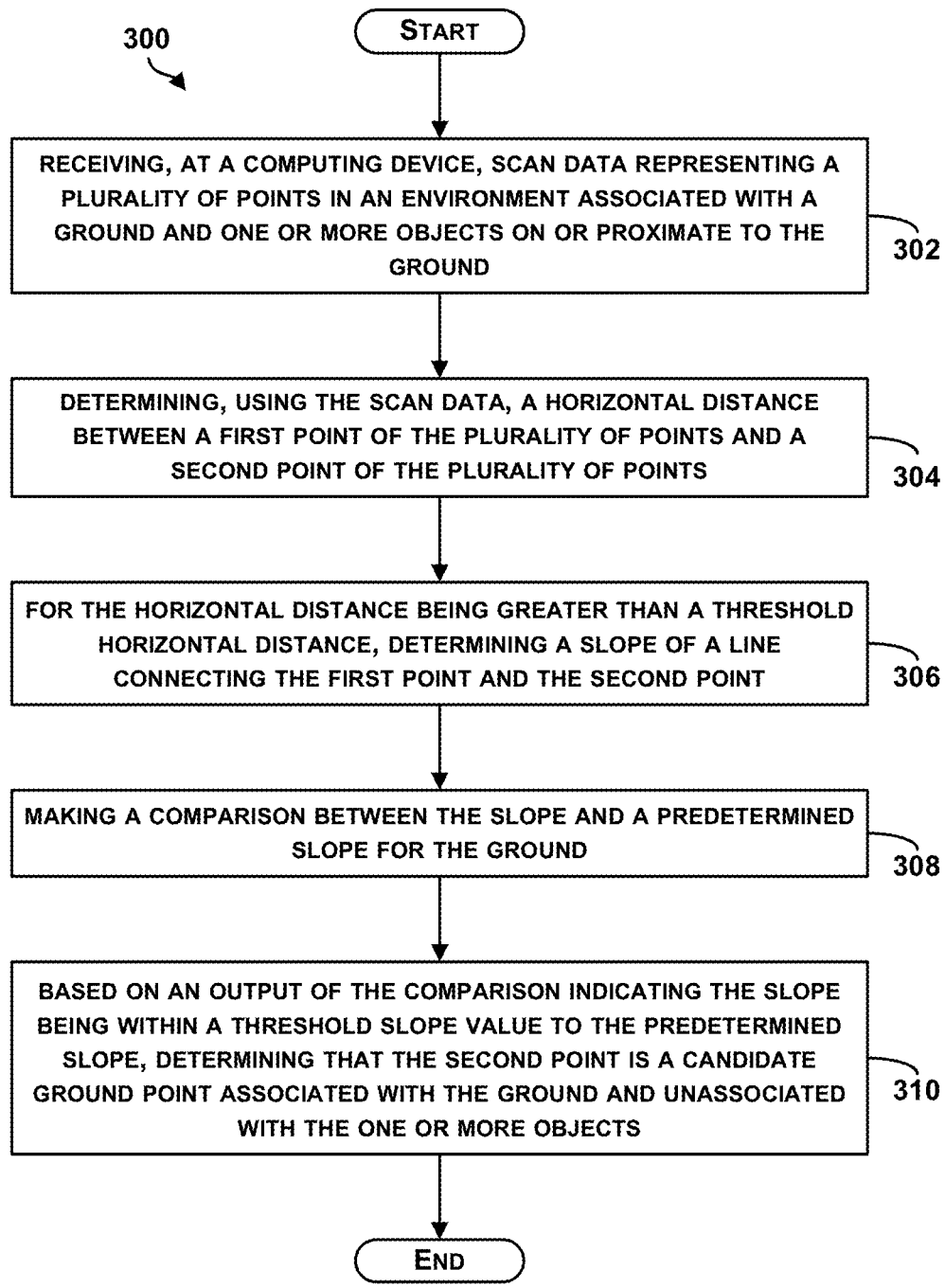
FIG. 3 is a flow chart of a method for object and ground segmentation from a sparse one-dimensional range data, in accordance with an example embodiment.

FIG. 3 is a flow chart of a method 300 for object and ground segmentation from a sparse one-dimensional range data, in accordance with an example embodiment. The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device, scan data representing a plurality of points in an environment associated with a ground and one or more objects on or proximate to the ground. The computing device, such as the computing device 111 described in FIG. 1, may be onboard a vehicle or may be off-board but in wireless communication with the vehicle, for example. The computing device may be configured to control the vehicle in an autonomous or semi-autonomous operation mode. In an example, an image-capture device (e.g., the camera 134 in FIG. 1 or the camera 210 in FIG. 2) may be coupled to the vehicle and in communication with the computing device. The image-capture device may be configured to capture images or video of the road and vicinity of the road on which the vehicle is travelling. In this example, the scan data may include images provided by the image-capture device to the computing device, and the plurality of points may be represented by pixels of the images.

Figure 4A:
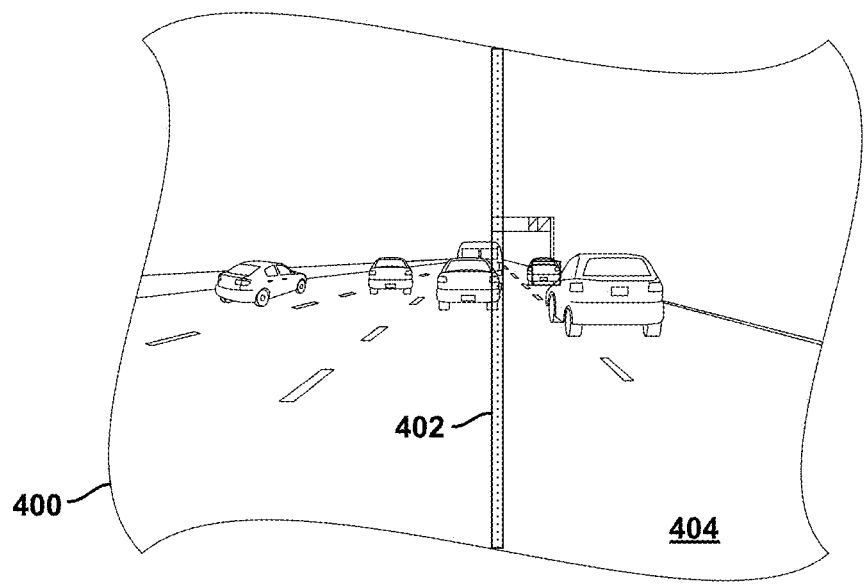
FIG. 4A illustrates an image and one-dimensional (1D) data comprising a column of pixels, in accordance with an example embodiment.

FIG. 4A illustrates an image 400 and one-dimensional (1D) data comprising a column of pixels 402, in accordance with an example embodiment. The image 400 may have been captured by an image-capture device coupled to a vehicle controlled by the computing device, for example. As an alternative to processing the entire image 400 to segment an environment of the vehicle into road or ground 404 and obstacles (e.g., vehicles or signs on the road 404), the computing device may efficiently process a 1D line scan such as the column of pixels 402 to improve computational efficiency and real-time performance.

Figure 4B:
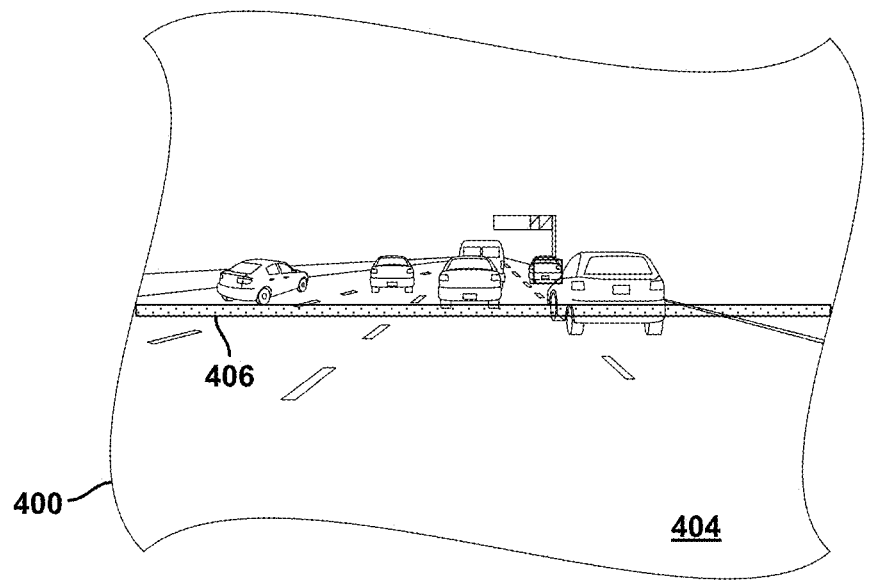
FIG. 4B illustrates an image and 1D data comprising a row of pixels, in accordance with an example embodiment.

FIG. 4B illustrates the image and 1D data comprising a row of pixels 406, in accordance with an example embodiment. As an alternative to processing the entire image 400 to segment the environment into the ground 404 and obstacles, the computing device may efficiently process a 1D line scan such as the row of pixels 402 to improve computational efficiency and real-time performance. Thus, the computing device may be configured to use a column of pixels such as the column of pixels 402 or a row of pixels such as the row of pixels 406 to identify the ground and the obstacles instead of processing the entire image 400 (or portions of the image 400).

In another example, the computing device may be configured to receive, from a LIDAR device (e.g., the LIDAR unit 132 in FIG. 1) coupled to the vehicle and in communication with the computing device, LIDAR-based information that includes a three-dimensional (3D) point cloud. The 3D point cloud includes points corresponding to light emitted from the LIDAR device and reflected from objects on the road 404 or in the vicinity of the road 404.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing ground, and obstacles or objects, which have been hit by the laser. The points may be represented by the LIDAR device in terms of azimuth and elevation angles, in addition to range, which can be converted to (X, Y, Z) point data relative to a local coordinate frame attached to the vehicle.

The computing device may be configured to utilize the point cloud to segment an environment of the vehicle into ground and objects on or proximate to the ground. However, the point cloud may include large amounts of data to be processed by the computing device rendering such processing computationally inefficient. When traveling at high speeds, and/or operating with low resolution or low update rate sensors, reducing data acquisition time and processing time may improve vehicle performance. To improve computational efficiency and real-time performance, the computing device may be configured to segment the environment into obstacles and ground using a 1D single scan line (i.e., a subset of the point cloud).

Figure 5:
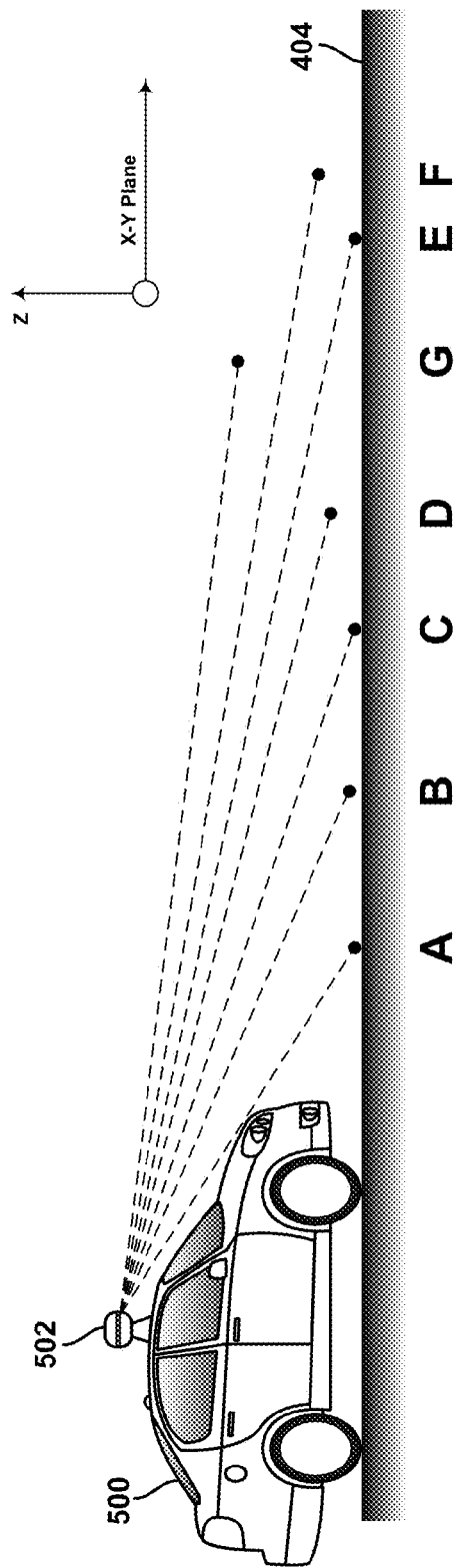
FIG. 5 illustrates a side profile of a vehicle engaged in obtaining a 1D line scan data, in accordance with an example embodiment.

FIG. 5 illustrates a side profile of a vehicle 500 engaged in obtaining a 1D line scan data, in accordance with an example embodiment. A scanner (e.g., a LIDAR unit) 502 may be coupled to the vehicle 500 and configured to collect data points by emitting light (e.g., laser or any electromagnetic radiation) and receiving reflections of the light from surface of the road or ground 404 and obstacles on or proximate to the road 404.

In FIG. 5, the scanner 502 may be configured to scan ahead of the vehicle 500 starting at a location (i.e., point A) close to the vehicle 500 and scanning further ahead of the vehicle 500, for example. The points are labeled A-G in order of an angle of the scan. FIG. 5 depicts that scan data for the points A-G are acquired through the scanner 502. However, in an example, the points A-G may also be represented by pixels of an image such as the column of pixels 402 in FIG. 4A. Point A would be represented by a bottom pixel in the column of pixels 402 and point G would be represented by a top pixel in the column of pixels 402.

Thus, the scan data received at the computing device may include a row or column of pixels of an image, or a 1D line scan from a point cloud, for example. The computing device may be configured to use the row or column of pixels of the image, or the 1D line scan to segment the environment of the vehicle 500 in an efficient manner. In some examples, the computing device may be configured to use a combination of information from the image and the point cloud. For instance, the computing device may be configured to use a column or row of pixels representing points on the road 404 or objects on the road 404, and use range information obtained from the point cloud indicative of distances between the vehicle 500 and the points to segment the environment of the vehicle 500.

Referring back to FIG. 3, at block 304, the method 300 includes determining, using the scan data, a horizontal distance a first point of the plurality of points and a second point of the plurality of points. As described above, if the scan data are acquired by a LIDAR device, the plurality of points in the environment of the vehicle may be represented by the LIDAR device in terms of azimuth and elevation angles, in addition to range, which can be converted to (X, Y, Z) point data relative to a local coordinate frame attached to the vehicle 500 as described above. Thus, the scan data received at the computing device may include range information indicative of respective horizontal distances between given points and height information indicative of respective vertical distances between the given points. If the scan data comprise pixels of an image, the computing device may be configured to determine the horizontal distance and vertical distance between points represented by the pixels using LIDAR-based information corresponding to the pixels.

Figure 6A:
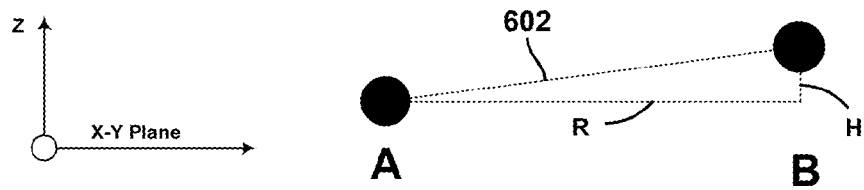
FIGS. 6A-6C illustrate geometric relationships between points of the 1D line scan data, in accordance with an example embodiment.
Figure 6B:
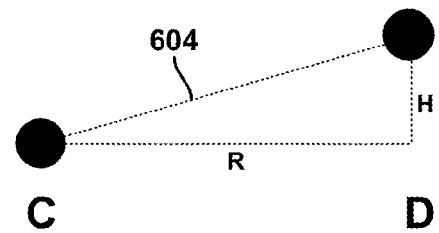
Figure 6C:
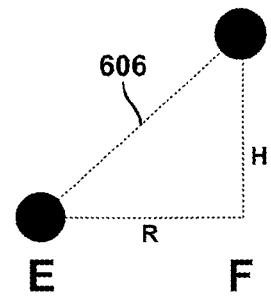

FIGS. 6A-6C illustrate geometric relationships between points of the 1D line scan data acquired as shown in FIG. 5, in accordance with an example embodiment. As depicted in FIGS. 6A-6C, the computing device may be configured to determine, using the scan data, two numbers for any two points (such as points A and B): difference in the Z coordinates (relative height or vertical distance) of the two points, referred to as H, and distance between the X-Y coordinates of the two points, referred to as R (horizontal distance).

Referring back to FIG. 3, at block 306, the method 300 includes, for the horizontal distance being greater than a threshold horizontal distance, determining a slope of a line connecting the first point and the second point. At block 308, the method 300 includes making a comparison between the slope and a predetermined slope for the ground. The computing device may be configured to process the scan data by applying tests on adjacent points based on geometric relationships between the adjacent points. All points may be considered candidate ground points unless they fail the tests.

In an example, the computing device may be configured to process the points of the scan data in range sorted order. In this manner, the points may be ordered based on range (i.e., distance from the vehicle), and pairs of two consecutive points may be processed by the computing device. However, in other examples, the points can be processed in any other order and the points may not be consecutive.

As depicted in FIG. 5, range (distance from the vehicle 500) of point G is less than range of points E-F that are captured before point G, yet point G has a larger height. Thus, point G is likely to belong to an obstacle and may not be considered a candidate ground point. In an example, the scan data may be screened or processed initially to identify points like point G, and the computing device may be configured to exclude such points from further analysis or processing. The remaining points may be considered candidate ground points, and may be tested by the computing device of the vehicle 500 to confirm whether the points belong to the ground 404 or obstacles. These tests may involve comparing range and relative height of a given point to other nearby points.

Generally, two points in the scan data that are close to each other such that a horizontal distance between the two points is less than a threshold horizontal distance while having a large difference in height (e.g., a vertical distance between the two points exceeding a threshold vertical distance) are likely to belong to an object and not the ground. Thus, as a first test, R is compared to the horizontal distance threshold. If R is less than the horizontal distance threshold, then a second test may be performed by comparing H to the vertical distance threshold. If H is less than the vertical distance threshold, then both points may be candidate ground points. However, if H is greater than the vertical distance threshold, then both points may be considered unassociated with the ground and are likely to be associated with an object. If R is greater than the horizontal distance threshold, or if R is less than the horizontal distance threshold but H is less than the vertical distance threshold, then a third test may be performed. The third test may include determining a slope of a line connecting the two points and comparing the slope to a predetermined slope of the ground at a location of the vehicle 500.

Figure 7:
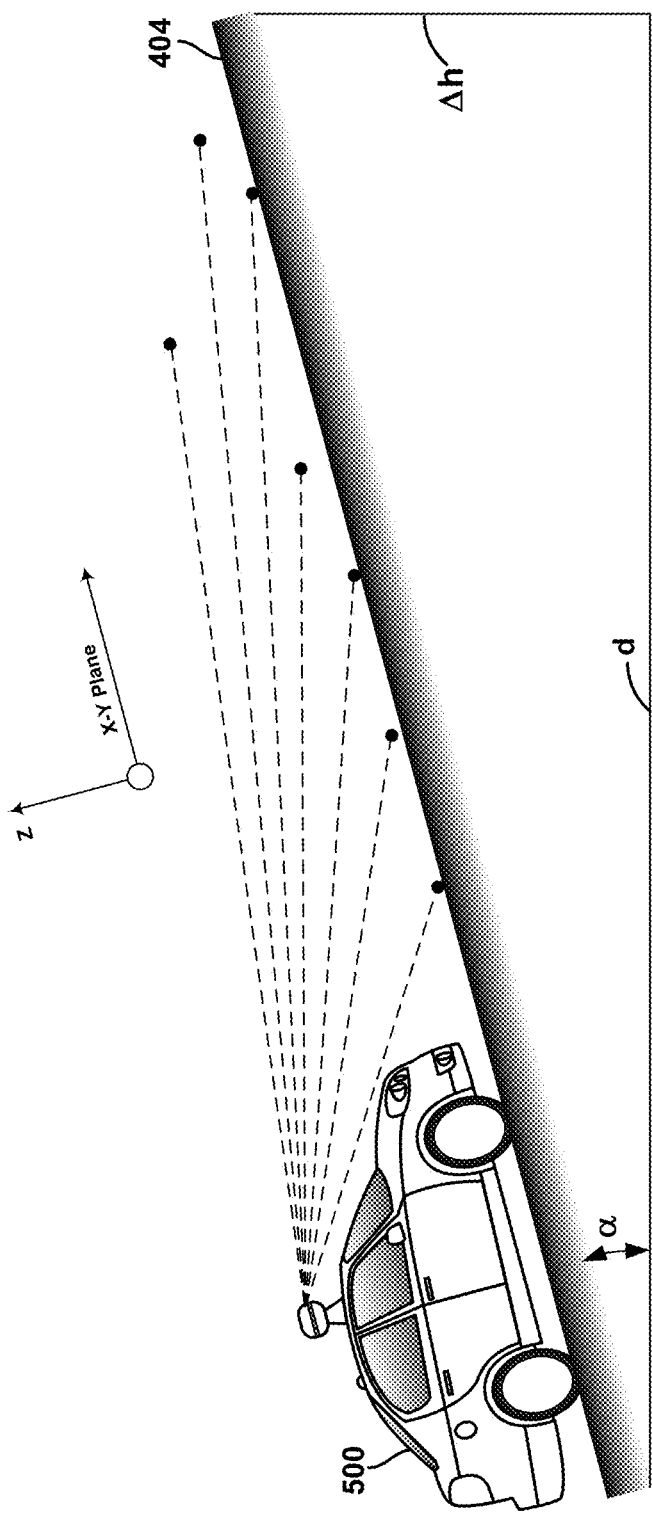
FIG. 7 illustrates road inclination, in accordance with an example embodiment.

FIG. 7 illustrates road inclination, in accordance with an example embodiment. Roads may be characterized by "grade," which is also referred to as slope, incline, gradient, pitch or rise. Grade or slope of the road 404 refers to an inclination of a surface of the road 404 relative to a horizontal plane. If the road 404 is a horizontal road, for example, then the road 404 has a zero inclination or slope. A larger number for grade or slope indicates higher or steeper degree of "tilt". Slope of the road 404 may be calculated as a ratio of "rise" Δh to "run" d, or as a fraction ("rise over run") as shown in FIG. 7. In some examples, road inclination may also be indicated by an angle of inclination "a," where:

$$\tan\alpha = \left(\frac{\Delta h}{d}\right) \quad [1]$$

In one example, grade or slope may be expressed as a percentage (e.g., a road has a 20% grade) and is calculated as:

$$100\left(\frac{\Delta h}{d}\right).$$

In another example, road inclination is determined as per mille figure:

$$1000\left(\frac{\Delta h}{d}\right).$$

The per mille figure could also be expressed as the tangent of the angle of inclination times 1000. In still another example, inclination can be expressed as a ratio of one part rise to so many parts run. For example, a slope that has a rise of 5 feet for every 100 feet of run would have a slop ratio of 1 in 20. These expressions are examples for illustration only, and other ways may be used to express inclination of a given road.

In examples, the computing device may be configured to determine the predetermined slope (e.g., slope of the road 404) based on the current location the vehicle 500. For instance, a Global Position System (GPS) module may be coupled to the vehicle 500 and may be configured to provide, to the computing device, location information relating to a current geographic location (i.e., with respect to the Earth, using satellite-based positioning data) of the vehicle 500 on the road 404. The location information may also include a known (predetermined) or an expected inclination of the road 404 at the location of the vehicle 500. In other examples, the computing device may be configured to have access to map information that indicates a slope of the road 404 on which the vehicle 500 is travelling. The word "slope" herein is used as a general indication of inclination or grade of a given road. Thus, "slope" may include a grade percentage, slope of the ground, angle of inclination, or any other metric that indicates inclination of the road 404 at a location of the vehicle 500.

Further, the computing device may be configured to determine, using the scan data, a slope of a line connecting two adjacent points being tested. For example, referring to FIGS. 6A-6C, the computing device may be configured to determine slope of line 602 connecting points A-B, slope of line 604 connecting points C-D, and slope of line 606 connecting points E-F, where:

$$\text{Slope} = \left(\frac{H}{R}\right) \quad [2]$$

The third test includes the computing device comparing, for any two points, the slope determined by equation [2], and the predetermined slope of the road 404 at the location of the vehicle 500. As mentioned above, other expressions or methods of expressing slope or inclination could be used, and the equation [2] is an example for illustration only. The computing device may be configured to compare any metric indicative of slope of a line connecting two points of the scan data, to a corresponding metric of slope or inclination of the ground at a location of the vehicle 500.

At block 310, the method 300 includes, based on an output of the comparison indicating the slope being within a threshold slope value to the predetermined slope, determining that the second point is a candidate ground point associated with the ground and unassociated with the one or more objects. Referring to points A and B in FIG. 6A as an example, assuming R is greater than the threshold horizontal distance (first test), the computing device may determine a slope (or a metric indicative of a slope) of line 602 connecting points A and B. If the slope is greater than an expected or predetermined slope of the ground at a location of the vehicle 500, then B may not be a candidate ground point. Otherwise, if the slope is within a threshold slope value from the predetermine slope (e.g., the determined slope of line 602 is substantially equal to the predetermined slope of the road 404 at the location of the vehicle 500) point B is considered a candidate ground point. As depicted in FIG. 6A, regarding points A and B, H is small relative to R, and thus B likely passes the test.

In contrast, referring to points C and D in FIG. 6B, H is large (relative to R) and the slope of the line 604 connecting C and D is likely to be greater than the predetermined slope of the ground at the location of the vehicle 500. Therefore, D is not likely to pass the test.

Referring to points E and F in FIG. 6C, R is small relative to H and is likely to be less than the threshold horizontal distance described with respect to the first test. In this case, the second test may be performed by comparing H to the vertical distance threshold. As shown in FIG. 6C, H may be larger than the threshold vertical distance described with respect to the second test, and thus the computing device may exclude the point F and not perform further tests. Further, because R is less than the threshold horizontal distance, and H is greater than the threshold vertical distance, both E and F likely belong to an obstacle. Even if further tests are performed for E and F, R is small relative to H and the slope of the line 606 connecting E and F is likely to be greater than the predetermined slope of the ground at the location of the vehicle 500, and thus point F fails the third test.

Based on the aforementioned tests applied to points A-G, points A, B, and C may be considered candidate ground points, while points D, E, F, and G may be considered to be unassociated with the ground and may be considered candidate object points (i.e., points that are associated with objects on or proximate to the road 404). The tests can be repeated for various points or pairs of points using the scan data to determine in real-time candidate ground points. Using sparse 1D scan data to determine the candidate ground points may improve computational efficiency and facilitate real-time determination of the candidate ground points. A computing device of the vehicle 500 may be configured to determine a control strategy or make navigation decision based on determining the candidate ground points.

In examples, the computing device may be configured to provide instructions to control the vehicle 500 based on the modified control strategy based on identifying the ground or a surface of the road 404 and obstacles on or proximate to the surface. For instance, the computing device may be configured to adjust translational velocity, or rotational velocity, or both, of the vehicle 500 to navigate the road 404 and avoid collision with identified obstacles.

As an example, the computing device may have detected an obstacle (e.g., a stopped vehicle or an accident site) based on segmentation of the environment of the vehicle 500 into ground and obstacles. In this example, the computing device may be configured to control the vehicle 500 according to a defensive driving behavior to safely navigate the obstacle. For example, the computing device may be configured to reduce speed of the vehicle 500, cause the vehicle 500 to change lanes, and/or shift to a position behind and follow while keeping a predetermined safe distance.

These control actions and driving situations are for illustration only. Other actions and situations are possible as well.

The method 300 has been described using a 1D line scan data from a LIDAR device that acquires data in a longitudinal manner starting at a location close to the vehicle 500 and scanning further ahead of the vehicle 500 in an increasing range. However, the method 300 could also be implemented using a 1D line scan data from a LIDAR device that acquires data in a lateral manner across a width of the road 404. Further, the method 300 may be implemented using a row of pixels or a column of pixels in an image in addition to LIDAR-based information.

In some embodiments, the disclosed methods may be implemented as computer program instructions encoded on a computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more program instructions 802 that, when executed by one or more processors may provide functionality or portions of the functionality described above with respect to FIGS. 1-7. Thus, for example, referring to the embodiments shown in FIG. 3, one or more features of blocks 302-310 may be undertaken by one or more instructions associated with the signal bearing medium 801. In addition, the program instructions 802 in FIG. 8 describe example instructions as well.

In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming to the IEEE 802.11 standard or other transmission protocol).

The one or more programming instructions 802 may be, for example, computer executable and/or logic implemented instructions. In some examples, a computing device such as the computing device described with respect to FIGS. 1-7 may be configured to provide various operations, functions, or actions in response to the programming instructions 802 conveyed to the computing device by one or more of the computer readable medium 803, the computer recordable medium 804, and/or the communications medium 805. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, at a computing device, scan data representing a plurality of points in an environment associated with a ground and one or more objects on or proximate to the ground;
    determining, using the scan data, a horizontal distance between a first point of the plurality of points and a second point of the plurality of points;
    for the horizontal distance being greater than a threshold horizontal distance, determining a slope of a line connecting the first point and the second point;
    making a comparison between the slope and a predetermined slope for the ground; and
    based on an output of the comparison indicating the slope being within a threshold slope value from the predetermined slope, determining that the second point is a candidate ground point associated with the ground and unassociated with the one or more objects.

2. The method of claim 1, further comprising:
    determining a vertical distance between the first point and the second point;
    for the horizontal distance being smaller than the threshold horizontal distance, making a comparison between the vertical distance and a threshold vertical distance;
    for the vertical distance being greater than the threshold vertical distance, determining that the second point is unassociated with the ground and is a candidate object point that represents a given point on the one or more objects; and
    for the vertical distance being less than the threshold vertical distance, determining that the second point is a candidate ground point.

3. The method of claim 1, further comprising:
    based on an output of the comparison indicating the slope is different from the predetermined slope by an amount greater than the threshold slope value, determining that the second point is unassociated with the ground and is a candidate object point that represents a given point on the one or more objects.

4. The method of claim 1, wherein the scan data further comprises range information indicative of respective horizontal distances between given points of the plurality of points and height information indicative of respective vertical distances between the given points of the plurality of points.

5. The method of claim 4, wherein the computing device is configured to control a vehicle, the method further comprising:
    determining, based on the range information and the height information, that a given point above an adjacent point and closer to the vehicle than the adjacent point is unassociated with the ground and is associated with the one or more objects.

6. The method of claim 1, wherein the scan data corresponds to light emitted from a light detection and ranging (LIDAR) device and reflected from the ground and the one or more objects.

7. The method of claim 1, wherein the scan data comprises pixels of an image depicting the ground and the one or more objects.

8. The method of claim 1, wherein the scan data comprises one-dimensional data that represents a column of pixels in an image, a row of pixels in the image, or a laser scan line.

9. The method of claim 1, wherein the computing device is configured to control a vehicle in an autonomous operation mode, the method further comprising:
    providing, by the computing device, instructions to control the vehicle based on determining candidate ground points, wherein providing the instructions comprises determining a driving decision for the vehicle.

10. The method of claim 1, further comprising:
    determining a vertical distance between the first point and the second point; and
    determining, for the horizontal distance being less than the threshold horizontal distance and the vertical distance being greater than a threshold vertical distance, that both the first point and the second point are candidate object points unassociated with the ground.

11. The method of claim 1, wherein determining that the second point is a candidate ground point comprises determining that the second point is a candidate ground point in real-time.

12. A non-transitory computer readable medium having stored thereon instructions that, when executed by a computing device, cause the computing device to perform functions comprising:
    receiving scan data representing a plurality of points in an environment of a vehicle associated with a ground and one or more objects on or proximate to the ground;
    determining, using the scan data, a horizontal distance between a first point of the plurality of points and a second point of the plurality of points;
    for the horizontal distance being greater than a threshold horizontal distance, determining a metric indicative of a slope of a line connecting the first point and the second point;
    making a comparison between the metric indicative of the slope of the line and a corresponding metric indicative of a predetermined slope for the ground; and
    based on an output of the comparison indicating that the metric is within a threshold value from the corresponding metric, determining that the second point is a candidate ground point associated with the ground and unassociated with the one or more objects.

13. The non-transitory computer readable medium of claim 12, wherein the functions further comprise:
    determining a vertical distance between the first point and the second point;
    for the horizontal distance being smaller than the threshold horizontal distance, making a comparison between the vertical distance and a threshold vertical distance;
    for the vertical distance being greater than the threshold vertical distance, determining that the second point is unassociated with the ground and is a candidate object point that represents a given point on the one or more objects; and
    for the vertical distance being less than the threshold vertical distance, determining that the second point is a candidate ground point.

14. The non-transitory computer readable medium of claim 12, wherein the functions further comprise:
    determining a vertical distance between the first point and the second point; and
    determining, for the horizontal distance being less than the threshold horizontal distance and the vertical distance being greater than a threshold vertical distance, that both the first point and the second point are candidate object points unassociated with the ground.

15. The non-transitory computer readable medium of claim 12, wherein the scan data comprises one-dimensional data that represents a column of pixels in an image, a row of pixels in the image, or a laser scan line.

16. The non-transitory computer readable medium of claim 12, wherein the functions further comprise:

providing instructions to control the vehicle in an autonomous operation mode based on determining candidate ground points, wherein the function of providing the instructions comprises determining a driving decision for the vehicle.

17. The non-transitory computer readable medium of claim 16, wherein determining candidate ground points comprises determining the candidate ground points in real-time.

18. A system, comprising:

at least one processor; and data storage comprising instructions that, when executed by the at least one processor, cause the system to perform functions comprising:

receiving scan data representing a plurality of points in an environment of a vehicle associated with a ground and one or more objects on or proximate to the ground;

determining, using the scan data, a horizontal distance between a first point of the plurality of points and a second point of the plurality of points;

for the horizontal distance being greater than a threshold horizontal distance, determining a metric indicative of a slope of a line connecting the first point and the second point;

making a comparison between the metric indicative of the slope of the line and a corresponding metric indicative of a predetermined slope for the ground; and based on an output of the comparison indicating that the metric is within a threshold value from the corresponding metric, determining that the second point is a candidate ground point associated with the ground and unassociated with the one or more objects.

19. The system of claim 18, wherein the functions further comprise:

based on an output of the comparison indicating the metric indicative of the slope of the line is different from the corresponding metric indicative of the predetermined slope by an amount greater than the threshold slope value, determining that the second point is unassociated with the ground and is a candidate object point that represents a given point on the one or more objects.

20. The system of claim 18, wherein the scan data comprises a one-dimensional line scan data that corresponds to light emitted from a light detection and ranging device and reflected from the ground and the one or more objects.

* * * * *